United States Patent [19]
Ziegler et al.

[11] Patent Number: 5,673,348
[45] Date of Patent: Sep. 30, 1997

[54] APPARATUS FOR ADJUSTMENT, ATTENUATING DEVICE, COUPLING DEVICE AND FILTERING DEVICE

[75] Inventors: Jochen Ziegler, Konigsfeld; Rolf Steiner, Rottenburg, both of Germany

[73] Assignee: Hewlett-Packard Company, Palo Alto, Calif.

[21] Appl. No.: 541,918

[22] Filed: Oct. 10, 1995

[30] Foreign Application Priority Data

Oct. 21, 1994 [EP] European Pat. Off. ............ 94116614

[51] Int. Cl.$^6$ ................................................ G02B 6/36
[52] U.S. Cl. ................................................ 385/90
[58] Field of Search ........................ 385/88–94, 52, 385/23, 140

[56] References Cited

U.S. PATENT DOCUMENTS

| | | | |
|---|---|---|---|
| 4,826,272 | 5/1989 | Pimpinella et al. | 385/92 |
| 4,878,730 | 11/1989 | Wall | 350/96.21 |
| 5,134,679 | 7/1992 | Robin et al. | 385/90 |
| 5,448,662 | 9/1995 | Kittell et al. | 385/90 |

FOREIGN PATENT DOCUMENTS

| | | |
|---|---|---|
| 0 447768 A1 | 1/1991 | European Pat. Off. . |
| 3301658A1 | 8/1983 | Germany . |
| 2-16512 | 1/1990 | Japan ............ 385/90 |
| WO-A-89-12244 | 12/1989 | WIPO . |

*Primary Examiner*—John Ngo

[57] ABSTRACT

This invention relates to devices in the field of optical communication networks and measurement devices and to an apparatus for adjustment of a first optical device relative to a second optical device. The apparatus for adjustment can be used for example in attenuating devices, coupling devices and filtering devices. A precise and reproducible adjustment is achieved by an apparatus for adjustment of a first optical device relative to the position of a second optical device and includes first apparatus for fixing the first optical device, second apparatus for fixing the second optical device and further apparatus for fastening said first and said second apparatus' planes parallel to each other.

8 Claims, 1 Drawing Sheet

APPARATUS FOR ADJUSTMENT, ATTENUATING DEVICE, COUPLING DEVICE AND FILTERING DEVICE

FIELD OF THE INVENTION

This invention relates to devices in the field of optical communication networks and measurement devices and, more particularly, to an apparatus for adjustment of a first optical device relative to a second optical device. Said apparatus for adjustment can be used for example in attenuating devices, coupling devices and filtering devices.

BACKGROUND OF THE INVENTION

Apparatuses for adjustment of a first optical device relative to the position of a second optical device are commonly used in optical communication systems. Such an apparatus is for example necessary to bring the entrance or exit of an optical fiber in the focus of a laser diode, a detector or a lens.

Commonly the fiber is fixed in a holder which is movable along an X- and Y- axis. One or more separate holders are used for the Z-adjustment. For the X- and Y-adjustment additional tools are needed to move the holder and to adjust the fiber in the focal point of an optical system. After this adjustment the holder or the holders are fixed to the housing with screws.

During fixation the alignment often changes and requires additional re-alignment as the fixation results in undesired tensions in the housing and the fiber. Over the time, this tensions relax or change and cause maladjustments.

Thus there is a need for an apparatus for adjustment allowing a precise adjustment in the range of micrometers.

SUMMARY OF THE INVENTION

The present invention relates to an apparatus for adjustment, attenuating device, coupling device and filtering device.

Basically, an apparatus for adjustment of a first optical device relative to the position of a second optical device comprises:

first means for fixing said first optical device, second means for fixing said second optical device, and means for fastening said first and said second means plane parallel to each other.

As said first and said second means for fixing are kept plane parallel to each other, by means for fastening, any adjustment of said first means for fixing said first optical device does not change the angle of the first and second optical device relative to the Z-axis.

According to a first embodiment of the invention the means for fastening comprises four spacing pieces, e.g. pins which are arranged at equally spaced points with respect to the first and second optical device. These means for fastening allow to keep the first and second means for fixing plane parallel to each other when the first means for fixing is moved for adjustment.

In a second embodiment of the invention the first and second means for fixing are plates or discs. Such an apparatus for adjustment can be easily produced out of a cube or a cylinder.

According to a third embodiment of the invention the movement or adjustment of the first means for fixing, e.g. a plate, is obtained by a first and a second differential spindle being orthogonal to each other. One end of each differential spindle comprises a male screw thread moving in a female screw thread of the first means for fixing while the other end of each differential spindle comprises a male screw thread moving in a female screw thread of a housing. By a differential spindle the adjustment of the first means for fixing can be performed easily and reproducible.

According to a fourth embodiment of the invention the thread-gradient difference of both male screw threads of each differential spindle is about 5/100 mm. By such a small thread-gradient-difference a resolution of 0.14 µm per 1° spindle rotation can be achieved allowing a precise adjustment.

According to a fifth embodiment of the invention the position of the first means for fixing is adjusted by screws, a piezo, an electrical drive, an electro-static drive or a thermo-mechanic drive. By these means the adjustment can be done automatically.

According to a further embodiment of the invention, the first and second means for fixing and the means for fastening are produced by a micro-mechanical process. By this process a small-sized apparatus for adjustment can be produced at low costs with high precision.

According to another embodiment of the invention the first or second optical device being fixed by the first or second means is an optical fiber.

According to further embodiments of the invention the apparatus for adjustment builds a part of an attenuating device, a coupling device or a filtering device.

If used in an attenuating device, the first optical device of the apparatus for adjustment is an optical fiber and the second optical device is a first optical lens providing a collimated beam. The optical lens is followed by a first optical attenuator which is particularly a rotating circular glass disc which is coated with a metallic film of variable thickness. The optical attenuator is followed by a second optical lens focussing the collimated beam on a detector or on the entrance of a further optical fiber. It will be understood that the apparatus for adjustment according to the invention can be used as an attenuating device itself if the first optical device being misaligned with regard to the second optical device.

If the apparatus for adjustment is used in a coupling device, the first optical device is a laser diode and the second optical device is an optical fiber or the first optical device is an optical fiber and the second optical device is a detector.

When the apparatus for adjustment is used in a filtering device, the first optical device is an optical fiber and the second optical device is a first optical lens to provide a collimated beam. The first optical lens is followed by a first optical filter, a second lens focussing the collimated beam on the focus of the entrance of a fiber or a detector.

The foregoing description points out that an apparatus for adjustment according to the invention can be used in various optical devices.

It is understood and expressly noted that the present invention relates to all useful and novel combinations of the above disclosed features, whether alone or in any other or arbitrary combination. Furthermore, all cited advantages can also be seen as objects solved by the invention in its entirety.

BRIEF DESCRIPTION OF THE DRAWINGS

For better understanding of the present invention, together with other and further objects, advantages and capabilities thereof, reference is made to the accompanying drawings, which are incorporated herein by reference and in which:

FIG. 1 shows an apparatus for adjustment of an optical fiber 4. The apparatus comprises an upper plate 1 and a lower plate 2 which are connected via four pins 3 so that they are plane parallel to each other, Lower plate 2 comprises an optical device 12 opposite to the optical fiber 4. Such an optical device can be e.g. a lens 12, a detector or a laser diode. The shown apparatus for adjustment is used to adjust the end of the optical fiber 4 in the focus of said optical device by adjusting the upper plate 1 along the X-axis 5a and the Y-axis 5b.

Figure 1:
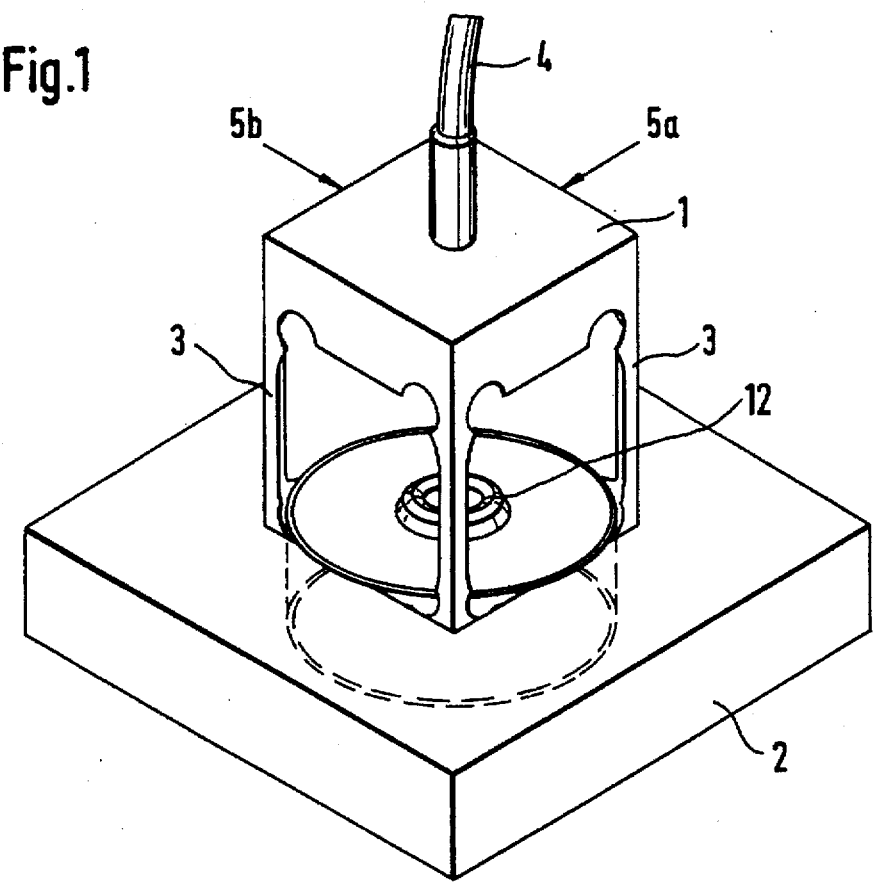
FIG. 1 depicts an apparatus for adjustment of an optical fiber.

If the upper plate 1 of the apparatus is moved along the X- or Y-axis 5a, 5b the pins 3 which are of equal length ensure that upper plate 1 and lower plate 2 stay plane parallel to each other. The upper plate 1 moves parallel without changing the angle of the fiber 4 relative to a Z-axis being orthogonal to the X- and Y-axis of the apparatus for positioning. Upper plate 1 is fixed plane parallel to lower plate 2 by four pins 3 at the edges of upper and lower plate.

Figure 2:
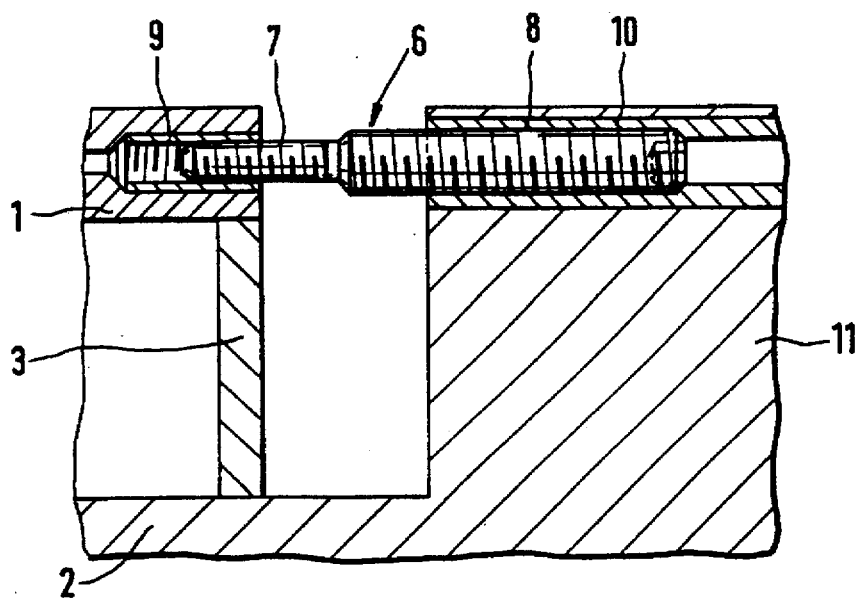
FIG. 2 exhibits a housing with the apparatus for adjustment according to FIG. 1 in a cross-sectional view, wherein the upper plate of said apparatus is adjusted by a differential spindle.

In the cross-sectional view of FIG. 1 which is taken along the X-axis 5a and shown in FIG. 2, a housing 11 comprises a second female screw thread 10. One end 8 of a differential spindle 6 moves in screw thread 10, while the other end 7 of the differential spindle 6 moves in a first female screw thread 9 of upper plate 1. Opposite to first male screw thread 7 of the differential spindle 6 a second male screw thread 8 is provided which moves in the first female screw thread 10 of the housing 11.

Preferably, the thread-gradient-difference of the first and second male screw thread 7, 8 of the spindle 6 is about 5/100 mm resulting in a resolution of 0.14 μm per 1° spindle rotation. This allows a very precise adjustment of upper plate 1 and the end of optical fiber 4 which is mounted in the upper plate 1. Furthermore, the described arrangement allows a reproducible adjustment.

Preferably, the housing 11 comprises a second differential spindle of the same kind as described with regard to FIG. 2 which is orthogonal to spindle 6 and allows the adjustment of upper plate 1 along the Y-axis 5b.

As the normal adjustment range is in the range of 100 μm the movement of the upper plate 1 by one differential spindle does not result in bending the other differential spindle. This is achieved by a sufficient clearance of the male screw threads of the differential spindles and the female screw threads of the upper plate 1.

The described apparatus or the housing can be used for an attenuating device. Then the end of an optical fiber is fixed in upper plate and a first optical lens is fixed by a lower plate. Said lens being followed by a first optical attenuator, e.g. a rotating circular glass disc being coated with a metallic film of variable thickness. Behind the optical attenuator a second optical lens focussing the attenuated beam on a detector device to analyze the attenuated beam can be provided.

By aid of the apparatus for adjustment either the adjustment of the end of the optical fiber in the focus of the first optical lens or the adjustment of the detector in the focus point of the second optical lens can be achieved in the above described manner.

Furthermore, the apparatus for adjustment can be used in a coupling device. Then a laser diode is fixed at an upper plate and at a lower plate one end of an optical fiber is fixed. By adjustment of the upper plate relative to the position of the lower plate the laser diode is positioned relative to the end of the fiber to obtain a good coupling.

The apparatus for adjustment can also be used in a coupling device for coupling an optical fiber with a detector. In this case the optical fiber is fixed at an upper plate and the detector at a lower plate. By adjustment of the upper plate, the end of the optical fiber is brought in the focus point of the detector.

Furthermore, the apparatus for adjustment can be used in a filtering device. In this case the end of an optical fiber is fixed at an upper plate while a collimating optical lens being fixed at a lower plate. The optical lens being fixed at the lower plate is followed by an optical filter. The optical filter can be followed by a further optical lens being fixed at the upper plate of a further apparatus for adjustment. At an upper plate of the further apparatus for adjustment a further collimating lens is fixed while a lower plate of the further apparatus for adjustment holds an optical fiber or a detector.

We claim:

1. Apparatus for adjustment of a first optical device relative to the position of a second optical device, comprising:

a first differential spindle with a first male screw thread and a second male screw thread, a second differential spindle with a third male screw thread and a fourth male screw thread, first means for fixing said first optical device and comprising (i) a first female screw thread for said first male screw thread and (ii) a second female screw thread extending orthogonally with regard to said first female screw thread for said third male screw thread, a housing comprising (i) a first female screw thread for said second male screw thread and (ii) a second female screw thread extending orthogonally to said first female screw thread of said housing for said fourth male screw thread, second means for fixing said second optical device, and means for fastening said first and said second means so that major planes thereof are parallel to each other, said means for fastening including at least two spacing pieces arranged at equally spaced points with respect to said first and second optical devices.

2. Apparatus according to claim 1, wherein said first and second means for fixing is a plate or a disc.

3. Apparatus according to claim 1, wherein a thread-gradient-difference of said first and second male screw threads or of said third and fourth male screw threads is about 5/100 mm resulting in a resolution of 0.14 um per 1° spindle rotation.

4. Apparatus according to claim 1, wherein said first and said second means for fixing and said means for fastening are produced by a micro-mechanical process.

5. Apparatus according to claim 1, wherein said first or second optical device is an optical fiber.

6. An attenuating device comprising an apparatus according to claim 1, wherein said first optical device and said second optical device are misaligned relative to each other.

7. A coupling device comprising an apparatus according to claim 1, wherein said first optical device is a laser diode and said second optical device is an optical fiber.

8. A coupling device comprising an apparatus according to claim 1, wherein said first optical device is an optical fiber and said second optical device is a detector.

* * * * *